United States Patent [19]

Moiseev et al.

[11] 4,075,166

[45] Feb. 21, 1978

[54] METHOD OF STABILIZATION OF RUBBERS AND VULCANIZATES

[76] Inventors: Vladimir Vasilievich Moiseev, Leninsky prospekt, 63, kv. 12; Vladimir Vasilievich Kosovtsev, Leninsky prospekt, 13, kv. 13; Galina Prokofievna Kolesnikova, ulitsa Karla Marxa, 92, kv. 23; Viktor Alexandrovich Zimnukhov, ploschad Lenina, 15, kv. 44; Lidia Alexcevna Miroshnikova, ulitsa Revoljutsii 1905 goda, 7, kv. 69, all of Voronezh; Esfir Abramovna Kimel, Tretya Vladimirskaya, 6, kv. 2, Moscow; Edit Konstantinovna Chefranova, Oktyabrsky prospekt, 120, kv. 95, Ljubertsy Moskovskoi oblasti; Valentina Ivanovna Guseva, Proletarskayprospekt, 16/37, kv. 53, Moscow; Ljudmila Vladimirovna Masagutova, Naberezhnaya Tarasa Shevchenko, 1/2, kv. 7, Moscow, all of U.S.S.R.

[21] Appl. No.: 621,624

[22] Filed: Oct. 10, 1975

[51] Int. Cl.$^2$ .................................................. C08K 5/18
[52] U.S. Cl. .................... 260/45.95 H; 260/45.9 AD; 260/45.9 QA; 260/784; 260/798; 260/803; 260/808
[58] Field of Search .................... 260/45.8 NT, 248.5, 260/45.9 AD, 808, 800, 45.9 AD, 45.9 QA, 803, 784, 798, 47 R, 45.7 PH

[56] References Cited

U.S. PATENT DOCUMENTS

| | | | |
|---|---|---|---|
| 1,825,636 | 9/1931 | Pink | 260/248.5 |
| 1,968,914 | 8/1934 | Semon | 260/800 |
| 2,618,665 | 11/1952 | Hess et al. | 260/248.5 |
| 3,098,841 | 7/1963 | Morris et al. | 260/808 |
| 3,208,859 | 9/1965 | Coffield | 260/808 |
| 3,328,489 | 6/1967 | Murdock | 260/47 R |
| 3,638,703 | 2/1972 | Endter et al. | 260/248.5 |

OTHER PUBLICATIONS

Auxiliary Substances for Polymeric Materials, by Piotrovskii et al., Rubber and Plastics Research Association of Great Britain, June 1967; pp. 131 and 132.

*Primary Examiner*—V.P. Hoke
*Attorney, Agent, or Firm*—Haseltine, Lake & Waters

[57] ABSTRACT

A method of stabilization of rubbers and vulcanizates thereof which involves incorporation, into a rubber, its solution or latex, of antioxidants, viz. phenolamine resins prepared by condensation of hexamethylene tetramine with alkyl-, alkenynyl-, dialkyl-, arylalkyl-, halosubstituted phenol, dihydroxydiphenylalkanes, hydroxybenzoic acids. Said resins may be used in a combination with conventional antioxidants such as secondary amines, diamines, 2,6-dialkylderivatives of phenol, phosphorus- and sulphur-containing compounds.

Said phenolamine resins are considerably superior over conventional antioxidants in their efficiency against thermal ageing during thermomechanical processing.

17 Claims, No Drawings

METHOD OF STABILIZATION OF RUBBERS AND VULCANIZATES

The present invention relates to the production of rubbers and, more specifically, to a method of stabilization of rubbers and vulcanizates.

To prevent rubbers from ageing during their separation from latexes or solutions, during processing and storage, use is always made of antioxidants. From the practical point of view, the most interesting are high-molecular antioxidants and, in particular, phenol resins.

Known in the art are methods of stabilization of polymers by means of phenol-formaldehyde resins such as resol resins.

The use of those resins, however, does not provide the desired effect. Novolac resins are hardly compatible with emulsion rubbers in the latex condition, since a portion of novolac resin is passed into waste waters.

The use of resol resins is hindered owing to their high reactivity. At a temperature within the range of from 60 to 90° C resol resins become converter to inefficient condensates. Both types of said phenol resins do not provide an efficient protection of rubber from ageing.

The above-mentioned principal difficulties have not made it possible to realize a method of stabilization of rubbers by means of phenol-formaldehyde resins.

For this reason, despite the fact that phenol-formaldehyde resins are relatively inexpensive, available, non-volatile, they tend to be unsuitable for the stabilization of rubbers.

Known hitherto in the production of rubbers are such antioxidants as Neozone D, p-phenylene diamine derivatives (diphenyl-p-phenylene diamine, dialkyl-p-phenylene diamine, alkylarylsubstituted p-phenylene diamine derivatives), 2,6-dialkylphenol derivatives, mainly 2,6-ditert.butyl-4-methylphenol (Ionol) and some phosphites, for example Polyguard.

There have been taken numerous efforts, however fruitless, to provide stabilizing agents which would satisfy such practical requirements as:
1. high efficiency;
2. availability;
3. simple technological scheme of the anti-oxidant production and its addition to the polymer;
4. non-toxicity and relatively low production costs;
5. non-volatile at elevated temperatures.

It is an object of the present invention to provide a method of stabilization which would be exempt of the above-mentioned disadvantages and would ensure an efficient protection of rubbers during the production and processing.

This object is accomplished by the use, as a stabilizing agent, of phenolamine resins which are condensation products of hexamethylene tetramine with alkyl-, alkenyl-, dialkyl-, arylalkyl-, halogen-substituted phenol derivatives; dihydroxydiphenylalkanes, hydroxybenzoic acids or mixtures of said resins with antioxidants pertaining to the series of secondary amines, diamines, 2,6-dialkyl derivatives of phenol, phosphorus and sulphur-containing compounds.

Said phenolamine resins proved to be highly efficient and superior, in the stabilizing effect thereof, over the prior art stabilizing agents.

An important advantage of said phenolamine resins is their property to substantially increase the tackiness of rubber mixtures and vulcanisates.

Phenolamine resins are superior over phenol-formaldehyde resins in their efficiency due to the presence of an additional reactive center, i.e. amino group. Phenolamine resin may be added to rubber in an amount of from 0.02 to 10%.

In the practice of the present invention it is quite sufficient to use, in many cases, 0.2 – 0.4% of phenolamine resins.

Phenolamine resins do not contain instable methylol groups unlike resol resins. This makes it possible to operate with said resins at a temperature within the range of from 80° to 100° C and above. The resin properties remain still unchanged wherefore it is possible to effectively introduce phenolamine resin into rubber.

Phenolamine resins are soluble in organic solvents, wellcompatible with rubbers and easily incorporated thereinto. The resins may be used both individually and in a mixture with conventional anti-oxidants pertaining to the series of secondary amines, diamines, 2,6-dialkyl derivatives of phenol, phosphites and sulphur-containing compounds.

As the stabilizing agents in accordance with the present invention use is made of phenolamine resins produced by condensation of hexamethylene tetramine (HMTA) with p-cresol, p-tert.butylphenol, hexylphenol, octylphenol, nonylphenol, dodecylphenyl, bromophenol, xylenol, diphenylolpropane, salicylic acid, p-hydroxybenzoic acid, cumylphenol, styrene-alkylated phenol, dimethylvinylethynyl-4-hydroxyphenylmethane mixture of p-tert.butylphenol and salicylic acid.

Phenolamine resins employed for stabilization of rubbers and vulcanizates in accordance with the present invention may be represented by the following general formula:

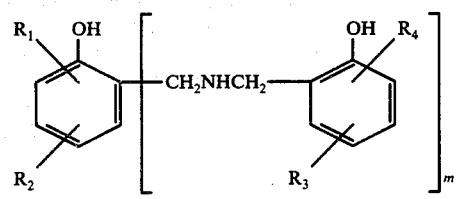

where $R_1$, $R_2$, $R_3$ and $R_4$ are each an alkyl with 1 to 12 carbon atoms, an alkenyl, arylalkyl, hydroxyarylalkyl, a halogen, of carboxy, and M is 2–20.

When $R_1$ and $R_4$ are each hydrogen, and $R_2$ and $R_3$ are each methyl, tert.$C_4H_9$, Cl, $NO_2$, or dimethylvinylethynylmethyl, this formula represents the resins already described in the literature.

When substituents $R_1$, $R_2$, $R_3$ and $R_4$ represent alkyls with 5 to 12 carbon atoms, arylalkyls such as phenylethyl, cumyl; hydroxyarylalkyls such as hydroxyphenylpropyl; or a carboxy group then it should be noted that such resins have not been hitherto described in the literature.

Also novel are resins prepared by condensation of hexamethylene tetramine and a mixture of an alkylphenol with 1 to 12 carbon atoms in the alkyl radical or an arylalkylphenol and hydroxybenzoic acid.

Shown in Examples 1 to 4 are typical embodiments of the synthesis of novel phenolamine resins; shown in Examples 5 to 31 is the method of the present invention intended for the stabilization of rubbers and vulcanizates by means of the resins according to the present invention in comparison with the prior art phenol-formaldehyde resins and other prior art antioxidants.

EXAMPLE 1

A mixture containing 97 g (0.5 g-mol) of octylphenol with the molecular weight of 194, and 14 g (0.1 g-mol) of hexamethylene tetramine is heated in a reaction flask under stirring to a temperature of from 140° to 145° C. The condensation reaction starting at this temperature is accompanied by a spontaneous heating of the reaction mixture to 165° C and vigorous evolution of ammonia. On completion of the reaction (20 – 30 minutes), which is evidenced by the stoppage of ammonia liberation, the reaction mass is poured into a porcelain cup. The resins is rapidly cooled and becomes a solid brittle amber-coloured product. After disintegration it comprises a light-yellow powder with the drop point of 94° C. The resin yield is 107 g. The resin is readily soluble in benzene, toluene, hexane, cyclohexane. Characteristics of the resin are given in Table hereinbelow.

Table 1

| No. | Parameter | Value |
|---|---|---|
| 1. | Appearance | light-yellow powder |
| 2. | Molecular weight | 728 |
| 3. | Ubbelohde drop point, ° C | 94 |
| 4. | Dumas nitrogen content, % | 6.5 |
| 5. | Solubility, g per 100 ml of | |
|   | toluene | 83 |
|   | hexane | 80 |
|   | mixture hexane-cyclohexane (15:85) | 85 |

EXAMPLE 2

A mixture containing 42 g (0.212 g-mol) of an alkylation product of phenol with styrene (a mixture of phenylethylphenols) with the boiling temperature of 140° – 150° C/5 mm and the molecular weight of 198 and 4.94 g of (0.035 g-mol) of hexamethylene tetramine is heated in a reaction flask for 50 minutes at the temperature of 130° C. The condensation reaction is accompanied by a vigorous evolution of ammonia. After cooling, the resulting resin comprises a very viscous golden-yellow liquid with the molecular weight of 550, nitrogen content of 4.1%.

EXAMPLE 3

A mixture containing 37 g (0.175 g-mol) of 4-cumylphenol (alkylation product of phenol with alpha-methylstyrene with the melting point of 68° – 71° C) and 4.9 g (0.035 g-mol) of hexamethylene tetramine are heated to the temperature of 135° C under stirring. The condensation reaction starting at this temperature is accompanied by a spontaneous heating of the reaction mixture to the temperature of 150° C and vigorous evolution of ammonia. On completion of the reaction which is evidenced by the stoppage of ammonia evolution the reaction mixture is poured into a porcelain cup. Cooled resin comprises a solid brittle amber-coloured product. After disintegration the resin is in the form of a light-yellow powder with the drop point of 101° C. The resin yield is 40 g. The resin is well soluble in cyclohexane. The resin characteristics are given in Table 2 hereinbelow.

Table 2

| No. | Parameter | Value |
|---|---|---|
| 1. | Appearance | light-yellow powder |
| 2. | Molecular weight | 880 |
| 3. | Ubbelohde drop point, ° C | 101 |
| 4. | Dumas nitrogen content, % | 4.5 |
| 5. | Solubility in cyclohexane, g per 100 ml | 11 |

EXAMPLE 4

Into a reaction flask provided with a thermometer and stirrer 60 g (0.4 g-mol) of p-tert.butylphenol, 10 g (0.071 g-mol) of hexamethylene tetramine and 7.8 g (0.056 g-mol) of salicylic acid are charged.

The reaction mixture is heated to the temperature of 150° C. The reaction is accompanied by a vigorous evolution of ammonia. The mixture is maintained at 150° C for 1.5 hours and then is pored, still in a hot condition, into a cup. The resulting mass is solidified in the form of a solid brittle amber-coloured resin having drop point of 140° C.

In a similar manner resins based on other substituted phenol derivatives or mixtures thereof are obtained.

EXAMPLE 5

To 200 g of butadiene-styrene rubber with the combined styrene content of 25% filled with 15% of naphthenoaromatic oil 0.7 g (0.35%) of a condensation product of hexamethylene tetramine with p-tert.butyl phenol is added on rolls.

The material thus produced is subjected to thermal ageing in the air at 100° C for 24 hours while periodically measuring its Defo hardness and intrinsic viscosity changes during that time.

Furthermore, the sample is oxidized in oxygen at 140° C to measure induction period of the oxidation and variations in the intrinsic viscosity of rubber during the induction period.

For the comparison purposes, prepared in a similar manner and tested were samples with 0.35% novolac phenol-formaldehyde resin, resol p-octylphenol-formaldehyde resin (Amberol ST-137) and with 0.35% and 1.3% of Neozone D. The tests results are given in Table 3 hereinbelow.

Table 3
Effect of Various Antioxidants on Stability of Rubber CKC-30 APKM-15

| No. | Antioxidant | Amount, % | Induction period, min | Intrinsic viscosity before ageing | Intrinsic viscosity after induction period | Thermal ageing at 100° C Defo hardness gf before ageing | Thermal ageing at 100° C Defo hardness gf after ageing | Intrinsic viscosity after ageing |
|---|---|---|---|---|---|---|---|---|
| 1. | Condensation product of butylphenol with HMTA | 0.35 | 69 | 1.99 | 2.07 | 640 | 520 | 2.01 |
| 2. | Novolac phenol-formaldehyde resin | 0.35 | 10 | 1.51 | 0.7 | 640 | 370 | 1.6 |
| 3. | Phenol-formaldehyde resol-type resin "Amberol ST-137" | 0.35 | 18 | 1.93 | 2.07 | 640 | 410 | 1.91 |
| 4. | Neozone D | 0.35 | 1.5 | 1.85 | 0.97 | 640 | 370 | 1.3 |
| 5. | Neozone D | 1.3 | 27 | 1.93 | 1.07 | 640 | 370 | 1.52 |

It is seen from Table 3 that the condensation product of p-tert.butylphenol with hexamethylene tetramine is superior over all the phenol-formaldehyde resins and Neozone D in the efficiency of rubber protection from oxidation and ageing in the air at elevated temperatures.

EXAMPLE 6

To rubber with characteristics much the same as in Example 5 is added 0.35% of phenolamine resin prepared by condensation of p-cresol with hexamethylene tetramine. Shown in Table 4 are data obtained from tests performed with this rubber in comparison with control samples containing phenol-formaldehyde resins and Neozone D.

Table 4

Effect of Antioxidants on Rubber Stability During Thermal Ageing

| No. | Antioxidant | Amount % | Characteristics before ageing | | Characteristics after ageing, 100° C, one day | |
|---|---|---|---|---|---|---|
| | | | Defo hardness gf | Intrinsic viscosity | Defo hardness, gf | Intrinsic viscosity |
| 1. | Condensation product of cresol with HMTA | 0.35 | 640 | 2.23 | 640 | 2.07 |
| 2. | Phenol-formaldehyde resin | 0.35 | 640 | 1.51 | 370 | 1.06 |
| 3. | Phenol-formaldehyde resin "Amberol ST-137" | 0.35 | 640 | 1.93 | 410 | 1.91 |
| 4. | Heozone D | 0.35 | 640 | 1.85 | 370 | 1.3 |
| 5. | Neozone D | 1.3 | 640 | 1.93 | 370 | 1.52 |

As it is seen from Table 4, the phenolamine resin according to the present invention is far more efficient in comparison with the other antioxidants employed.

EXAMPLE 7

Into rubber with the characteristics described in Example 5 a phenolamine resin prepared by condensation of hexamethylene tetramine with 3,4-xylenol is introduced.

The test results are given in Table 5 hereinbelow in comparison with phenol-formaldehyde resin and Neozon D.

EXAMPLE 8

Into rubber with the characteristics described in Example 5 a phenolamine resin is introduced which is prepared by condensation of hexamethylene tetramine with p-bromophenol.

The test results are given in Table 6 hereinbelow.

Table 6

Effect of Phenolamine Resin on Rubber Stability

| No. | Antioxidant | Amount, % | Induction period, min. | Intrinsic Viscosity | | Thermal ageing 100° C one day | | |
|---|---|---|---|---|---|---|---|---|
| | | | | initial | after induction period | Defo hardness, gf | | Intrinsic viscosity after ageing |
| | | | | | | initial | after ageing | |
| 1. | Condensation product of bromophenol with HMTA | 0.35 | 69 | 1.99 | 2.07 | 640 | 570 | 1.98 |
| 2. | Neozone D | 0.35 | 15 | 1.85 | 0.97 | 640 | 370 | 1.3 |
| 3. | Neozone D | 1.3 | 27 | 1.93 | 1.07 | 640 | 370 | 1.52 |

EXAMPLE 9

Rubber samples were prepared from rubber with the characteristics described in Example 5 containing 0.35% of a condensation product of p.-tert.butylphenol with hexamethylene tetramine and 1.4% of Neozone D;

mixture of 0.35% of phenol-formaldehyde resin and 1.4% of Neozone D;

mixture of 0.35% of resin "Amberol ST-137" and 1.4% of Neozone D;

1.4% of Neozone D.

Said samples were subjected to rolling at the temperature of 140° C; Defo hardness of the samples were measured before and after the treatment. The test results are given in Table 7.

Table 5

Effect of Resins on Rubber Stability

| No. | Antioxidant | Amount, % | Induction period, min. | Intrinsic viscosity | | Thermal ageing, 100° C one day | | |
|---|---|---|---|---|---|---|---|---|
| | | | | initial | after induction period | Defo hardness gf | | Intrinsic viscosity after ageing |
| | | | | | | initial | after ageing | |
| 1. | Condensation product of 3,4-xylenol with HMTA | 0.35 | 44 | 2.31 | 1.25 | 640 | 560 | 1.98 |
| 2. | Phenol-formaldehyde resin | 0.35 | 10 | 1.51 | 0.7 | 640 | 370 | 1.6 |
| 3. | Phenol-formaldehyde resin "Amberol ST-137" | 0.35 | 18 | 1.93 | 1.07 | 640 | 410 | 1.91 |
| 4. | Neozone D | 0.35 | 15 | 1.85 | 0.97 | 640 | 370 | 1.52 |
| 5. | Neozone D | 1.30 | 27 | 1.93 | 1.07 | 640 | 370 | 1.52 |

Table 7

Effect of Antioxidants on Rubber Stability During Thermomechanical Treatment on Rolls

| No. | Antioxidants | Amount, % | Treatment time, min. | Defo hrdness, gf before ageing | Defo hrdness, gf after ageing |
|---|---|---|---|---|---|
| 1. | Condensation product of tert.butylphenol with HMTA | 0.35 | 30 | 590 | 410 |
|  | Neozone D | 1.4 |  |  |  |
| 2. | Phenol-formaldehyde novolac resin | 0.35 | 20 | 680 | 195 |
|  | Neozone D | 1.4 |  |  |  |
| 3. | Amberol ST-137 | 0.35 | 20 | 680 | 220 |
|  | Neozone D | 1.4 |  |  |  |
| 4. | Neozone D | 1.4 | 20 | 680 | 195 |

It is seen from Table 7 that the mixture of the condensation product of tert.butylphenol with hexamethylene tetramine and Neozone D ensures better protection of rubber from destruction during mechanical processing than mixtures of phenol-formaldehyde resins with Neozone D or only Neozone D.

EXAMPLE 10

To 6 l of a commercial latex of butadiene-alpha-methylstyrene rubber similar to rubber 1712 with the solids content of 20% a condensation product of octylphenol with hexamethylene tetramine was added in the amount of 7.5 g along with 336 g of naphthenoaromatic oil. Separation of rubber was effected by a conventional method, i.e. by means of sodium chloride and sulphuric acid.

In a similar manner control samples were prepared from rubber with such antioxidants as a mixture of Neozone D and diphenyl-p-phenylene diamine (DPPD); Wingstay 200 (derivative of dialkyl-p-phenylene diamine available from Goodyear Co.) and novolac phenolformaldehyde resin.

The rubber stability was defined by retained Mooney viscosity after rolling the rubber for 20 minutes at 140° C. Rolling was performed with 200 g of the rubber on rolls with the clearance between rolls of 1 mm and roll dimensions 320 × 160 mm at the friction ratio of 1:1.24. The test results obtained are shown in Table 8 hereinbelow.

Table 8

Retained Mooney Viscosity of Rubber Containing Various Amounts of Antioxidants on Thermal Treatment

| No. | Antioxidants | Amount | Retained Mooney viscosity after rolling, per cent |
|---|---|---|---|
| 1. | Condensation product of octylphenol with hexamethylene tetramine | 0.5 | 77 |
|  |  | 1.0 | 76 |
| 2. | Neozone D + DPPD | 1.2 0.3 | 31 |
| 3. | Wingstay 200 | 0.5 | 33 |
|  |  | 1.0 | 47 |
| 4. | Phenol-formaldehyde resin (novolac-type) | 1.0 | 47 |

As seen from Table 8, the phenolamine resin prepared from octylphenol and hexamethylene tetramine is substantially superior over phenol-formaldehyde resin and other antioxidants.

EXAMPLE 11

A condensation product of octylphenol and hexamethylene tetramine is introduced, as a suspension, into a latex of rubber of the 1712-type. The suspension of antioxidant has the following formulation:

| 1. | Condensation product of octylphenol and hexamethylene tetramine | 402 kg |
|---|---|---|
| 2. | Potassium soap of synthetic aliphatic acids | 12 kg |
| 3. | Water | 5 m$^3$ |

The mixture is passed through a homogenizer to give a fine, staple and transportable suspension.

Into 120 m$^3$ of a rubber latex with the solids content of 20% added with 1.2% of Neozone, the above suspension of the phenolamine resin is introduced in the amount of 0.7% (calculated on the rubber). The latex and oil emulsion are delivered to a mixer, followed by separation of the polymer. Drying of the rubber is effected without any troubles in a drying oven a temperature of 95° to 100° C; no polymer destruction is observed.

The test results illustrating stability of said rubber during thermomechanical processing on rolls at the temperature of 140° C for 20 minutes and thermal ageing at 100° C for 24 hours are shown in Table 9 hereinbelow.

As it is seen from Table 9, the condensation product of octylphenol with hexamethylene tetramine ensures a reliable protection of the polymer against ageing.

Table 9

Rubber Stability During Thermal Treatment on Rolls and Thermal Ageing

| Thermomechanical processing | | | Thermal ageing | | |
|---|---|---|---|---|---|
| Mooney viscosity | | | | | |
| Initial | After treatment | Retained, per cent | Initial | After treatment | Retained, per cent |
| 63.5 | 46 | 72.4 | 63.5 | 62 | 98 |

EXAMPLE 12

A 2% solution of a condensation product of octylphenol and hexamethylene tetramine, in toluene, is added into polyisoprene rubber in amounts of 0.8 g of resin per 100 g of the rubber; into the latter 0.4% of Neozone D was previously added.

The polymer is separated by the method of aqueous outgassing, dried at a temperature within the range of from 70 to 80° C for a period amounting to 10-16 hours. Shown in Table 10 are data illustrating various of Mooney viscosity values during thermal ageing of the polymer with the phenolamine resin and the control stabilizing system (Neozone D plus diphenyl-p-phenylene diamine).

Table 10

Variations of Mooney Viscosity During Thermal Ageing of Polyisoprene Rubber

| No. | Antioxidant | Amount, % | Duration of heat-treatment at 100° C, hours 0 | Duration of heat-treatment at 100° C, hours 6 |
|---|---|---|---|---|
| 1. | Neozone D + condensation product of octylphenol with hexamethylene tetramine | 0.4 0.8 | 77.5 | 72 |
| 2. | Neozone D + DPPD | 0.4 0.34 | 75.5 | 70.5 |

As it is seen from Table 10, the phenolamine resin according to the present invention ensures a good protection of even such extremely instable product as polyisoprene rubber.

EXAMPLE 13

To 200 g of rubber with the characteristics described in Example 5 containing 1.2% of Neozone D 1 g of a condensation product of p-nonylphenol with hexamethylene tetramine is added on rolls. Samples of the starting rubber with the phenolamine resin are maintained at the remperature of 140° C in the air for 30 minutes. Shown in Table 11 are data illustrating Walles plasticity before and after ageing and retained plasticity index (PRI).

As it is seen from Table 11, in the presence of the phenolamine resin the rubber is retained practically unchanged while in the presence of Neozone D the same rubber is deeply destructed.

Table 11
Walles Plasticity Retaining for the Rubber Modified with the Condensation Product of p-Nonylphenol with HMTA

| No. | Antioxidant | Walles plasticity Initial | Walles plasticity After ageing | Plasticity retaining index (PRI), % |
|---|---|---|---|---|
| 1. | Neozone D | 0.23 | 0.05 | 27 |
| 2. | Condensation product of nonylphenol with HMTA | 0.22 | 0.20 | 95 |

EXAMPLE 14

Into 200 g of oil-extended butadiene-styrene rubber with the characteristics described in Example 5 0.7 g of a condensation product of dodecylphenol and hexamethylene tetramine is incorporated on rolls. The resulting product is subjected to thermal ageing at the temperature of 140° C for 30 minutes. Plasticity retaining index (PRI) is 92%, while that of the control sample with Neozone D is 27%.

EXAMPLE 15

Into butadiene-styrene statistical rubber with the combined styrene content of 18% Neozone D was added on rolls in the amount of 1.1%; into another rubber sample was added a condensation product of dimethylvinylethynyl-4-hydroxyphenylmethane and hexamethylene tetramine (1.1%) and into the thirs sample was added Neozone D (0.8%) and a condensation product of dimethylvinylethynyl-4-hydroxyphenylmethane with hexamethylene tetramine (0.3%). The thus-prepared samples were oxidized by oxygen at the temperature of 140° C, and a corresponding induction period of oxidation was determined. The results are given in Table 12.

Table 12
Effect of Phenolamine Resin on Rubber Stability During Oxidation

| No. | Antioxidant system | Amount, % | Induction period, minutes |
|---|---|---|---|
| 1. | Neozone D | 1.1 | 78 |
| 2. | Condensation product of dimethylvinylethynyl-4-hydroxyphenylmethane with hexamethylene tetramine | 1.1 | 147 |
| 3. | Condensation product of dimethylvinylethynyl-4-hydroxyphenylmethane with HMTA plus Neozone D | 0.3 0.8 | 425 |

It is seen from Table 12 that the mixture of the condensation product of dimethylvinylethynyl-4-hydroxyphenylmethane with hexamethylene tetramine and Neozone D is a highly efficient stabilizing agent substantially superior over the efficiency of each individual component.

EXAMPLE 16

Into an oil-extended butadiene-styrene rubber with the characteristics described in Example 5 there are incorporated mixtures of Neozone D with different phenol-formaldehyde resins and a condensation product of dimethylvinylethynyl-4-hydroxyphenylmethane with hexamethylene tetramine. The thus-prepared samples are subjected to mechanical processing on rolls at the temperature of 140° C for 20 minutes. Plasto-elastic properties of the rubber are measured before and after ageing. The results obtained are shown in Table 13.

Table 13
Variations in Plastoelastic Properties of Rubber During Rolling

| No. | Antioxidant system | Amount, % | Defo hardness, gf | Recovery, mm | Plasticity | Elastic recovery |
|---|---|---|---|---|---|---|
| 1. | Neozone D | 1.4 | 195 | 0.9 | 0.56 | 1.17 |
| 2. | Condensation product of dimethylvinylethynyl-4-hydroxyphenylmethane with hexamethylene tetramine Neozone D | 0.35 1.4 | 580 | 2.5 | 0.37 | 2.36 |
| 3. | Phenol-formaldehyde resin (novolac-type) Neozone D | 0.35 1.4 | 195 | 0.8 | 0.54 | 0.97 |
| 4. | Resol-type phenol-formaldehyde resin Amberol ST-137 Neozone D | 0.35 1.4 | 220 | 1.0 | 0.56 | 1.03 |
| | Plasto-elastic properties of the rubber before the treatment | | 680 | 3.1 | 0.32 | 2.75 |

As can be seen from Table 13, the mixture of Neozone D with the condensation product of dimethylvinylethynyl-4-hydroxyphenylmethane with hexamethylene tetramine is substantially superior, in its efficiency, over the mixtures of Neozone D with phenol-formaldehyde resins and individual Neozone D.

EXAMPLE 17

Into synthetic isoprene rubber a mixture of Neozone D with a condensation product of dimethylvinylethynyl-4-hydroxyphenylmethane with hexamethylene tetramine and a mixture of Neozone D with N,N'-diphenyl-p-phenylene diamine (DPPD) are added on rolls at a temperature ranging from 60° to 70° C. The thus-prepared samples are subjected to thermal ageing for 3 days (72 hours) at the temperature of 100° C. Every day intrinsic viscosity is measured; the results obtained are given in Table 14 hereinbelow.

Table 14

Intrinsic Viscosity Variations of Rubber at 100° C During Thermal Ageing

| No. | Antioxidant system | Amount, % | Initial | Thermal ageing for 3 days at 100° C |  |  |
|---|---|---|---|---|---|---|
|  |  |  |  | One day after | Two days after | Three days after |
| 1. | Neozone D | 0.65 | 2.66 | 1.98 | 1.53 | 1.44 |
|  | DPPD | 0.3 |  |  |  |  |
| 2. | Neozone D | 0.65 |  |  |  |  |
|  | Condensation product of dimethylvinylethynyl-4-hydroxyphenyl-methane with HMTA | 0.3 | 2.45 | 1.12 | 1.96 | 1.79 |
| 3. | Neozone D | 0.65 |  |  |  |  |
|  | Condensation product of dimethylvinylethynyl-4-hydroxyphenyl-methane with HMTA | 1.0 | 2.58 | 2.28 | 2.27 | 2.17 |

It is seen from Table 14 that the mixture of Neozone D with the condensation product of dimethylvinylethynyl-4-hydroxyphenylmethane with hexamethylene tetramine is substantially superior, in its efficiency, over the commercial mixture of Neozone D with N,N'-diphenyl-p-phenylene diamine (DPPD).

EXAMPLE 18

Into butadiene-styrene rubber extended with 15% of naphthenoaromatic oil a phenolamine resin is added prepared by condensation of hexamethylene tetramine (HMTA) with cumylphenol in accordance with the procedure of Example 3.

Control samples are incorporated with a novolac phenolformaldehyde resin and Neozone D.

Shown in Table 15 are data illustrating variation of physico-mechanical characteristics of rubber samples during mechanical processing of the rubber on rolls at the temperature of 140° C for 20 minutes.

Table 15

Variations in Rubber Properties During Thermomechanical Treatment on Rolls

| No. | Antioxidant | Amount, % | Retaining, % |  |
|---|---|---|---|---|
|  |  |  | Defo hardness | Recovery |
| 1. | Neozone D | 1.5 | 29 | 29 |
| 2. | Phenol-formaldehyde resin | 0.3 | 29 | 26 |
| 3. | Condensation product of cumylphenol with hexamethylene tetramine | 0.1 | 78 | 88 |
| 4. | " | 0.3 | 94 | 100 |
| 5. | " | 0.5 | 91 | 100 |

The results given in Table 15 demonstrate that the incorporation of the phenolamine resins into the rubber makes it possible to considerably increase its stability to the level of a retained Defo hardness as high as 94% after ageing. At the same time, retained Defo hardness of the rubber containing Neozone D and phenol-formaldehyde resin under the same conditions is only 29%.

EXAMPLE 19

Into a butadiene-styrene rubber of the 1500-type in a latex condition different amounts of the phenolamine resin of Example 18 are introduced. For comparison purposes phenolformaldehyde resin was incorporated into the rubber under the same conditions. Induction periods (τ) were measured; corresponding values thereof are shown in Table 16 hereinbelow.

Table 16

Effect of Resins on Rubber Stability During Oxidation

| No. | Antioxidant | Amount, % | Induction period, (130° C), min |
|---|---|---|---|
| 1. | Phenol-formaldehyde resin | 0.3 | 12 |
| 2. | Phenol-formaldehyde | 0.6 | 15 |
| 3. | Condensation product of cumylphenol with HMTA | 0.3 | 17 |
| 4. | " | 0.6 | 50 |
| 5. | " | 3.0 | 110 |

The data of this Table reveal the advantages of the phenolamine resin over the control antioxidant in respect of its protective efficiency.

EXAMPLE 20

Into a butadiene-styrene rubber prepared on organolithium catalysts the phenolamine resin of Example 18 is added on rolls at a temperature of 70° – 75° C. A control antioxidant is introduced under the same conditions. Data illustrating results of oxidation tests of the rubbers at the temperature of 130° C are shown in Table 17 hereinbelow.

Table 17

Effect of Resins on Rubber Stability During Oxidation

| No. | Antioxidant | Amount, % | Induction period, min. |
|---|---|---|---|
| 1. | Phenol-formaldehyde resin | 0.5 | 40 |
| 2. | Condensation product of cumylphenol with HMTA | 0.5 | 196 |

Induction period value of oxidation of the rubber containing the phenolamine resin according to the present invention is 5 times that of the rubber containing phenol-formaldehyde resin.

EXAMPLE 21

Into an oil-extended butadiene-styrene rubber with the characteristics described in Example 5 a resin is introduced, on rolls, prepared as in Example 2 by condensation of hexamethylene tetramine with the styrene-alkylated phenol.

As the control sample use is made of rubber containing 1.5% by weight of Neozone D. The rubber samples are subjected to thermal ageing in an air-thermostat at the temperature of 100° C for 24 hours, rolling at 140° C for 20 minutes and tested of oxidation at 140° C. The test results are shown in Tables 18 and 19 hereinbelow.

Table 18

Effect of Phenolamine Resin on Rubber Stability During Oxidation (140° C) and Thermal Ageing (100° C)

| No. | Antioxidant | Amount, % | Induction period, min. | Walles plasticity initial | Walles plasticity after ageing | retained |
|---|---|---|---|---|---|---|
| 1. | Neozone D | 1.5 | 60 | 0.22 | 0.11 | 50 |
| 2. | Phenolamine resin | 0.5 | 95 | 0.23 | 0.21 | 93 |

Table 19

Effect of Phenolamine Resin on Rubber Stability During Thermomechanical Processing or Rolls

| | | Neozone D (1.5%) | | | Resin (0.5%) | | |
|---|---|---|---|---|---|---|---|
| No. | Parameters | Initial | After ageing | Retained, % | Initial | After ageing | Retained, % |
| 1. | Defo hardness, gf | 530 | 185 | 35 | 530 | 490 | 93 |
| 2. | Recovery, mm | 2.4 | 0.8 | 33 | 2.4 | 2.2 | 92 |
| 3. | Karrer plasticity | 0.38 | 0.59 | 155 | 0.38 | 0.41 | 107 |
| 4. | Elastic recovery, mm | 2.85 | 1.99 | 70 | 2.85 | 2.76 | 97 |

These data show that the use of the phenolamine resin in accordance with the present invention makes it possible to ensure a high stability of rubbers during thermal ageing and thermomechanical processing thereof.

EXAMPLE 22

Into a butadiene-styrene rubber with the characteristics described in Example 5 different amounts of 4 cumylphenol and a reaction product of hexamethylene tetramine with cumylphenol are added on rolls at the temperature of 60° C. The rubber samples are processed by rolling at 140° C for 20 minutes. The test results are shown in Table 20.

Table 20

Retained Defo Hardness During Thermomechanical Treatment of Rubber

| No. | Antioxidant | Amount, % | Retaining of the rubber hardness after thermomechanical treatment, % |
|---|---|---|---|
| 1. | Control sample without antioxidant | — | 8 |
| 2. | 4-cumylphenol | 0.2 | 22 |
| 3. | 4-cumylphenol | 1.0 | 36 |
| 4. | Phenolamine resin | 0.2 | 90 |

As it is seen from Table 20, introduction of the phenolamine resin in accordance with the present invention makes it possible to retain the rubber hardness after mechanical treatment by 90%, whereas the use of 4-cumylphenol — only by 36%.

EXAMPLE 23

Into a butadiene-styrene rubber with the characteristics described in Example 5 a phenolamine resin is added on rolls in the amount of 0.5%; this resin is prepared by the procedure of Example 4 by way of condensation of hexamethylene tetramine with a mixture of p-tert.butylphenol and salicylic acid Plasticity retaining index (PRI) after ageing at the temperature of 140° C for 30 minutes is for this rubber, 91%, while the control sample containing Neozone D (1.2%- has the plasticity retaining index of 47%.

EXAMPLE 24

Into two samples of butadiene-nitrile rubber antioxidants are introduced on rolls at a temperature within the range of from 70° to 80° C: Neozone D in the amount of 2.5% and a condensation product of hexamethylene tetramine with 4-cumylphenol taken in the amount of 1.0% respectively.

Efficiency of the antioxidant action is determined by oxidation of the rubber samples at 140° C. The test results are shown in Table 21 hereinbelow.

Table 21

Effect of Phenolamine Resin on Rubber Stability During Oxidation

| No. | Antioxidant | Amount, % | Induction period, min. |
|---|---|---|---|
| 1. | Neozone D | 2.5 | 11 |
| 2. | Condensation product of cumylphenol with HMTA | 1.0 | 87 |

As is seen from the Table, the effectiveness of the condensation product of cumylphenol with hexamethylene tetramine is by almost 8 times that of Neozone D even when the former is employed in a smaller amount than the latter.

EXAMPLE 25

Into butadiene-alpha-, ethylstyrene rubber extended with 15% of a naphthenoaromatic oil a phenolamine resin is added on rolls in the amount of 0.3%; this resin is prepared by condensation of diphenylolpropane with hexamethylene tetramine. A rubber mix is prepared from that rubber in accordance with the following formula, parts by weight:

rubber: 100
stearic acid: 1.5
zinc oxide: 5
altax: 3
sulphur: 2.

Vulcanization is effected at the temperature of 143° C for 60 minutes; plate thickness is 0.3 mm. For the thus-prepared samples a stress relaxation rate constant is determined at 130° C in the air. For vulcanizates with the resin of the present invention it was $0.34 \times 10^{-3}$, while for the control sample containing Neozone D it was $0.43 \times 10^{-3}$. Therefore, the phenolamine resin ensures more efficient protection of vulcanizates from ageing than the standard antioxidant Neozone D.

EXAMPLE 26

Into 200 g of butadiene-styrene rubber with the characteristics described in Example 5 1 g of a condensation product of hexamethylene tetramine with o-hydrobenzoic (salicylic) acid is introduced on rolls at the temperature of 60° C. The resulting sample is subjected to a thermomechanical treatment on rolls with a clearance of 1 mm at the temperature of 140° C for 20 minutes. After the treatment, hardness of the rubber containing the phenolamine resin is retained by 80%, whereas that of the control sample containing Neozone D is only 35%. Condensation product of hexamethylene tetramine with p-hydroxybenzoic acid gives a similar result.

EXAMPLE 27

Into butadiene-styrene rubber of the 1500-type in a latex condition a phenolamine resin is introduced at the amount of 0.2%, 0.5% and 1.0% which is prepared by condensation of hexamethylene tetramine with octylphenol as in Example 1 by weight on rubber. To the control sample is added only Neozone D in an amount of 1%. After separation and drying, rubber mixtures are prepared from the rubber in accordance with the following formula, parts by weight:

rubber: 100
stearic acid: 1.5
zinc oxide: 5
altax: 3
sulphur: 2

The vulcanizaation is effected at the temperature of 143° C for 60 minutes. The vulcanisates are subjected to thermal ageing at the temperature of 100° C in a cabinet for a period of 3 and 5 days.

Data illustrating variations of tensile strength at rupture and relative elongation of the tested samples are shown in Table 22 hereinbelow.

Table 22

| | | | Tensile strength, kgf/cm² time, days | | | Elongation, per cent time, days | | |
|---|---|---|---|---|---|---|---|---|
| No. | Antioxidant | Amount, % | 0 | 3 | 5 | 0 | 3 | 5 |
| 1. | Condensation product of octylphenol with HMTA | 0.2 | 260 | 233 | 243 | 600 | 535 | 540 |
| 2. | " | 0.5 | 260 | 249 | 215 | 650 | 580 | 500 |
| 3. | " | 1.0 | 260 | 217 | 220 | 630 | 490 | 590 |
| 4. | Neozone D | 1.0 | 260 | 198 | 173 | 570 | 424 | — |

As it is seen from the Table, the phenolamine resin is more efficient for the vulcanizate protection from ageing than Neozone D.

EXAMPLE 28

To samples of butadiene-alpha-methylstyrene rubber similar to rubber of the 1712-type are added:

a. mixtures of a secondary amine — a condensation product of diphenylamine and acetone (antioxidant BLE-25 available from "Uniroyal Corp.") with a phenolamine resin prepared by condensation of hexamethylene tetramine with octylphenol as in Example 1;

b. a mixture of a secondary amine - a derivative of paraphenylene diamine (antioxidant Wingstay 200, "Goodyear Co.") with the same phenolamine resin. Results of the test for thermal ageing expressed as plasticity retaining index are shown in Table 23 hereinbelow.

Table 23
Efficiency of Mixtures of Phenolamine Resin with BLE-25 and Wingstay 200

| Antioxidant | Amount of amine, % | Resin content, % | PRI, % |
|---|---|---|---|
| Mixture of phenolamine resin with BLE-25 | | 0 | 20 |
| | 0.6 | 0.2 | 58 |
| | | 0.4 | 90 |
| | | 0 | 21 |
| | 1.0 | 0.2 | 50 |
| | | 0.4 | 90 |
| Mixture of Wingstay 200 with phenolamine resin | | 0.0 | 22 |
| | 0.6 | 0.2 | 81 |
| | | 0.4 | 87 |
| | | 0 | 37 |
| | 1.0 | 0.2 | 67 |
| | | 0.4 | 87 |

As it is seen from Table 23, small amounts of the phenolamine resin according to the present invention ensure substantial increase in the efficiency of conventional antioxidants pertaining to the series of secondary amines or diamines.

EXAMPLE 29

To 200 g of butadiene-styrene rubber of the 1500-type 0.2 g of a phenolamine resin prepared by condensation of nonylphenol with hexamethylene tetramine and 2 g of 2,6-ditert.butyl-4-methylphenol (ionol) are added on rolls. The rubber is subjected to ageing at 140° C for 60 minutes. Plasticity retaining index is, in this case, 97%, whereas that for the control samples of the rubber containing only resin is 90% and in the case of the rubber sample modified with only ionol said index is 75%.

EXAMPLE 30

To 200 g of an oil-extended (15% of a naphthenoaromatic oil) butadiene-styrene rubber 0.2 g of a resin prepared by condensation of hexamethylene tetramine and octylphenol and 2.5 g of tri(nonylphenyl)-phosphite (Polyguard) are added on rolls. The rubber is subjected to ageing at the temperature of 140° C for 30 minutes. Plasticity retaining index for the rubber is 99%, whereas in the case of control rubber samples containing only resin it is 85% and for those containing only polyguard said index is 40%.

EXAMPLE 31

To 100 g of butadiene-styrene rubber of the 1712-type 0.4 g of a phenolamine resin prepared from hexamethylene tetramine and octylphenol is added on rolls along with 0.5 g of dilaurylthiodipropionate. Plasticity retaining index after ageing of the rubber at the temperature of 140° C for 30 minutes is 90%.

What is claimed is:

1. A method of stabilization of synthetic polydiene and copolymeric diene rubbers and their vulcanizates which comprises incorporation of phenolamine resins as antioxidants into said rubbers, a solution or latex thereof, said phenolamine resins having the formula

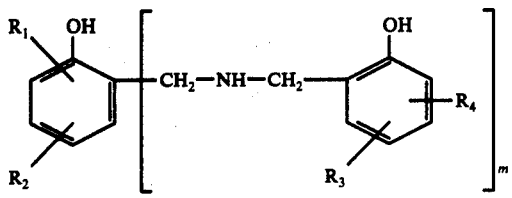

wherein $R_1$, $R_2$, $R_3$ and $R_4$ are each alkyl of from 1 to 12 carbon atoms, alkenynyl, aralkyl, hydroxy aralkyl, halogen, or carboxy and $m$ is 2–20, obtained by condensation of hexamethylene tetramine with alkyl-, alkenynyl-, dialkyl-, aralkyl- or halo-substituted phenols, with dihydroxydiphenyl alkanes, hydroxybenzoic acids or mixtures of said resins with antioxidants selected from the series of secondary amines, diamines, 2,6-dialkyl derivatives of phenol, and phosphorus- and sulphur-containing compounds.

2. A method according to claim 1, wherein the antioxidant is a condensation product of p-cresol or a mixture of cresols with hexamethylene tetramine.

3. A method according to claim 1, wherein the antioxidant is a condensation product of para-tert.butylphenol with hexamethylene tetramine.

4. A method according to claim 1, wherein the antioxidant is a condensation product of a hexylphenol with hexamethylene tetramine.

5. A method according to claim 1, wherein the antioxidant is a condensation product of an octylphenol with hexamethylene tetramine.

6. A method according to claim 1, wherein the antioxidant is a condensation product of a nonylphenol with hexamethylene tetramine.

7. A method according to claim 1, wherein the antioxidant is a condensation product of a dodecylphenol with hexamethylene tetramine.

8. A method according to claim 1, wherein the antioxidant is a condensation product of xylenol with hexamethylene tetramine.

9. A method according to claim 1, wherein the antioxidant is a condensation product of dimethylvinylethylnyl-4-hydroxyphenylmethane with hexamethylene tetramine.

10. A method according to claim 1, wherein the antioxidant is a condensation product of hexamethylene tetramine with a styrene-alkylated phenol.

11. A method according to claim 1, wherein the antioxidant is a condensation product of a cumylphenol with hexamethylene tetramine.

12. A method according to claim 1, wherein the antioxidant is a condensation product of salicylic acid with hexamethylene tetramine.

13. A method according to claim 1, wherein the antioxidant is a condensation product of para-hydroxybenzoic acid with hexamethylene tetramine.

14. A method according to claim 1, wherein the antioxidant is a condensation product of a diphenylolpropane with hexamethylene tetramine.

15. A method according to claim 1, wherein the antioxidant is a condensation product of hexamethylene tetramine with a mixture of an alkylphenol or arylalkylphenol and hydroxybenzoic acid.

16. A method according to claim 1, wherein the antioxidant is a condensation product of a halogen-substituted phenol with hexamethylene tetramine.

17. A method according to claim 1, wherein said phenolamine resins are incorporated into the rubber in an amount of from 0.02 to 10%.

* * * * *